T. W. McKENZIE.
STEERING WHEEL FOR MOTOR CARS.
APPLICATION FILED JUNE 5, 1915.
1,160,738.
Patented Nov. 16, 1915.
2 SHEETS—SHEET 1.
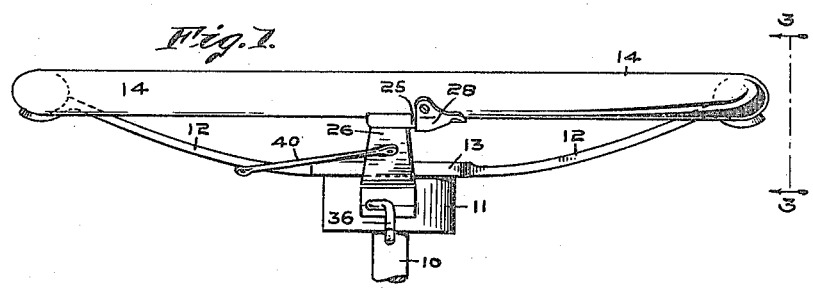
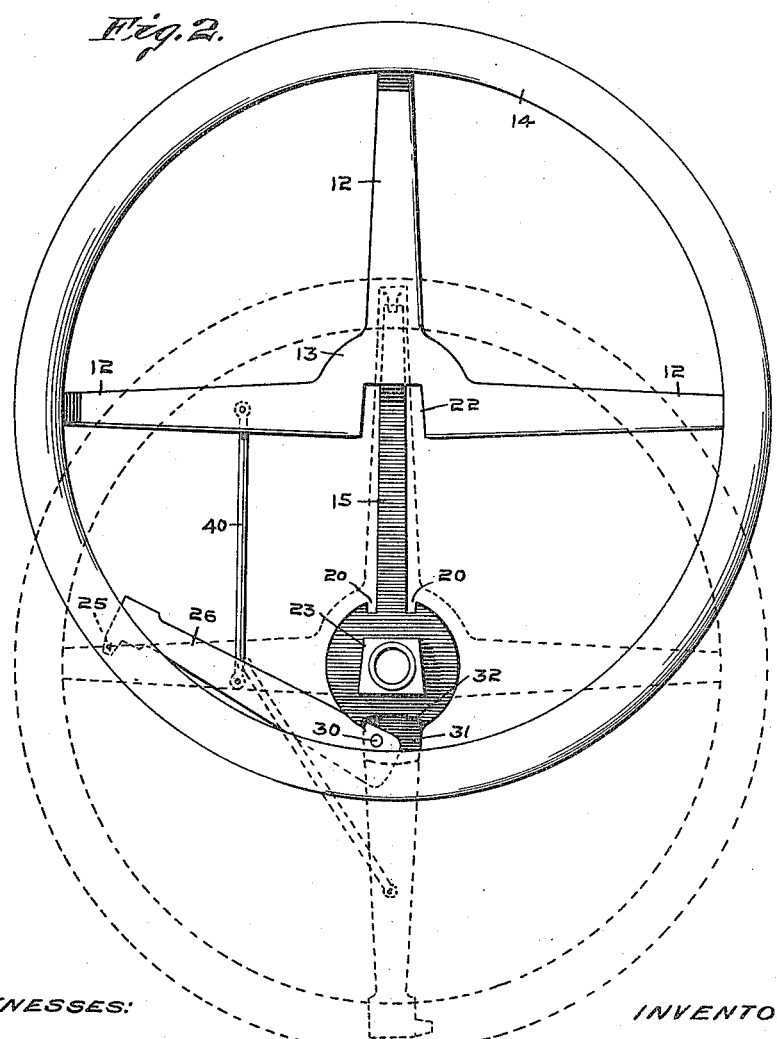
WITNESSES:
L. B. Woerner.
W<sup>m</sup> Hurte.
INVENTOR
Thomas W. McKenzie,
By Minturn & Woerner,
ATTORNEYS.

T. W. McKENZIE.
STEERING WHEEL FOR MOTOR CARS.
APPLICATION FILED JUNE 5, 1915.
1,160,738.
Patented Nov. 16, 1915.
2 SHEETS—SHEET 2.
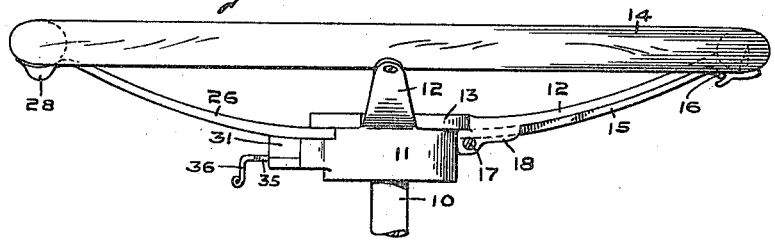
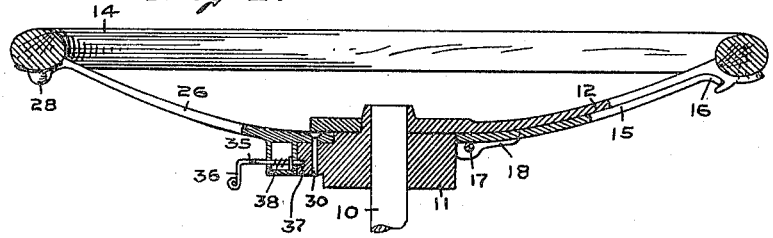
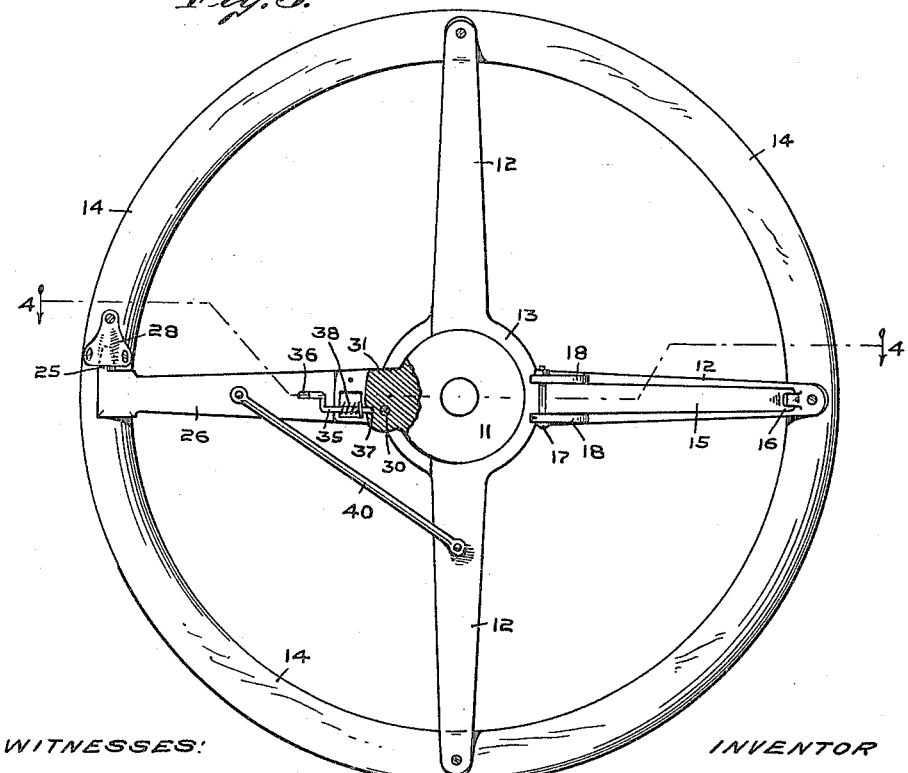
WITNESSES:
L. B. Woerner.
Wm Hurte.
INVENTOR
Thomas W. McKenzie,
By Minturn & Woerner,
ATTORNEYS.

UNITED STATES PATENT OFFICE.

THOMAS W. McKENZIE, OF INDIANAPOLIS, INDIANA, ASSIGNOR OF ONE-HALF TO CHARLES OEFTERING, OF INDIANAPOLIS, INDIANA.

STEERING-WHEEL FOR MOTOR-CARS.

1,160,738.  Specification of Letters Patent.  Patented Nov. 16, 1915.

Application filed June 5, 1915. Serial No. 32,380.

*To all whom it may concern:*

Be it known that I, THOMAS W. MCKENZIE, a citizen of the United States, residing at Indianapolis, in the county of Marion and State of Indiana, have invented certain new and useful Improvements in Steering-Wheels for Motor-Cars, of which the following is a specification.

This invention relates to steering wheels employed in connection with the steering mechanisms of motor and similar vehicles. In the proposed steering wheels the continuity of the rims is undisturbed and not formed in sections, as obtains in my former Letters Patent No. 1,104,524, so that stronger and more rigid wheels result, besides eliminating considerable work and expense, such as matching and assembling the different sections of my former wheel and in dispensing with the necessary hinges therein.

The object of the invention is to provide a steering wheel of the above character which can bodily be moved laterally from the staff or steering head to provide additional room for the operator when getting into or out of the motor car, and when the wheel is in operative position it will be rigidly secured to the steering head.

A further object of the invention is to provide a steering wheel of the above character which, in addition to its movability, will be strong and durable.

I accomplish the objects of the invention by means of the construction shown in the accompanying drawings, forming a part hereof, in which—

Figure 1 is a side elevation of my improved steering wheel. Fig. 2 is a top or plan view showing by means of the dotted lines my improved wheel in its normal operative position and by means of the full lines the position of the wheel when moved or shifted to one side of the steering head. Fig. 3 is a side elevation of the wheel when looking in the direction of the arrows on the line 3—3 in Fig. 1. Fig. 4 is a cross section of the wheel on the line 4—4 in Fig. 5. Fig. 5 is an underside plan view of the steering wheel.

Referring to the drawings, 10 represents the steering shaft, in common use in motor cars. To the upper end of the shaft 10 I secure a hub 11 in a fixed manner so that the two rotate in unison. This hub is formed separate from the steering wheel as shown and for purposes which will be hereinafter explained. The steering wheel comprises as an integral part the three spokes 12 and a central joining member 13, and the rim 14 which is secured to the outer ends of the spokes in the usual manner. The hub 11 is provided with an extended integral arm 15 which acts as a guide for the wheel in its lateral movement away from the hub 11 and terminates at its free end in a curl or hook 16 which contacts the transverse bolt 17, to both limit the distance of displacement of the wheel and to prevent separation of the parts. The bolt 17 is retained by the ribs 18 on the spoke 12 and is sufficiently removed from the under face of the spoke to permit the passage of the arm 15. When the wheel stands in normal position the ribs 18 slightly project into a pair of notches 20 in the hub 11 and prevent independent movement of either part when the wheel is under torsional strain. To add further strength and rigidity between the wheel part and hub 11 the joining member 13 of the former is provided with a central notch 22 to receive the extension 23 on said hub, and the notch 22 and extension 23 are formed wedge shape so that the parts make a closer working fit as the wheel is moved home. When the wheel occupies its normal operative position, its accidental displacement is prevented by means of the hook 25, formed on the outer end of the movable spoke 26, engaging a socket formed by means of the plate 28 secured to the rim 14 of the wheel. As shown, the spoke 26 is movable to enable it to be removed from the space that becomes available when the wheel is moved to one side with respect to the hub 11. This spoke is pivoted at 30 to an enlargement 31 formed on the side of the hub 11, and the hub is notched as at 32 to receive the butt end of the spoke 26 and to limit its travel around the pivot 30 in a direction to extend it. When the spoke 26 is extended, as shown in Fig. 5, it is locked by means of the latch bar 35 which terminates in a hook 36 which is readily accessible to the operator for retracting the latch bar. The opposite end of the latch bar 35 engages an aperture 37 in the hub 11 when the spoke 26 stands in normal position and a spring 38 is provided for normally holding the latch bar against the periphery of the hub and forcing it into the aperture 37 when the two register.

The movable parts of the wheel so far described would involve two operations which would consume too much time—that of moving the spoke 26 backward and then shifting the wheel. To enable these parts to be shifted simultaneously, I connect the spoke 26 with one of the spokes 12, or any part of the movable wheel, by means of the connecting bar 40 so that with a single movement in throwing the spoke 26 the whole wheel will move from the dotted position to the position shown in full lines in Fig. 2. This construction is simple, performing two operations in one, and having the nature of the invention in mind and the many times it is used during the course of a day on delivery wagons and trucks, much time will be saved, which is of the utmost importance.

Having thus fully described my said invention, what I desire to secure by Letters Patent, is—

1. In a device of the above described class, the combination, with a steering shaft, a hub secured to the upper end of said shaft, a guide arm secured to and projecting laterally from said hub, a steering wheel susceptible of lateral movement from said hub along said arm, a spoke formed independently of the wheel and pivotally mounted on said hub and susceptible of being moved beneath the steering wheel when occupying its shifted position.

2. In a device of the above described class, the combination, with a steering shaft, a hub secured to the upper end of said shaft, a guide arm projecting laterally from said hub, a curl formed on the free end of said guide arm, a steering wheel susceptible of being moved laterally from said hub along said arm, and stop means engaging the curl on the end of the guide arm for arresting the travel of said wheel away from said hub.

3. In a device of the above described class, the combination, with a steering shaft, a hub secured to the upper end of said shaft and provided with peripheral notches, a guide arm projecting laterally from said hub, a steering wheel susceptible of lateral movement from said hub along said arm, and integral ribs arranged at right angles of the wheel to engage the notches in the hub and prevent independent rotary movement between the parts when occupying normal position.

4. In a device of the above described class, the combination, with a steering shaft, a hub secured to the upper end of said shaft, a guide arm projecting laterally from said hub, a steering wheel susceptible of lateral movement from the hub along said arm, said wheel being provided with a centrally located wedge shaped notch, and a wedge shaped extension on the hub to enter and snugly fit said notch when the wheel is moved home.

5. In a device of the above described class, the combination, with a steering shaft, a hub secured to the upper end of said shaft, an arm projecting laterally from said hub for supporting the wheel in its shifted position, a steering wheel susceptible of being moved laterally from said hub, a spoke formed independently of the wheel and pivotally mounted on said hub, said spoke being capable of being moved from its normal position to and underneath the steering wheel when the latter is shifted to one side of the hub, and means for securing the movable spoke and wheel together in their normal operative position.

6. In a device of the above described class, the combination, with a steering shaft, a hub secured to the upper end of said shaft, an arm projecting laterally from said hub, a steering wheel susceptible of being moved laterally from said hub, a spoke formed independently of the wheel and pivotally secured to the hub and susceptible of being moved back and beneath the shifted steering wheel, means on the hub for limiting its movement in a direction to extend the movable spoke, and means for locking the movable spoke in operative position.

7. In a device of the above described class, the combination, with a steering shaft, a hub secured to the upper end of said shaft, an arm projecting laterally from said hub, a steering wheel susceptible of being moved laterally from said hub, an independently formed wheel spoke pivotally secured to said hub and susceptible of being moved away from its normal position, and means connecting the movable spoke and wheel together for simultaneously moving said wheel when moving the movable spoke.

In witness whereof, I have hereunto set my hand and seal at Indianapolis, Indiana, this 19th day of May, A. D. one thousand nine hundred and fifteen.

THOMAS W. McKENZIE. [L. S.]

Witnesses:
F. W. WOERNER,
L. B. WOERNER.

Copies of this patent may be obtained for five cents each, by addressing the "Commissioner of Patents, Washington, D. C."